(12) United States Patent
Kiest, Jr. et al.

(10) Patent No.: US 6,994,118 B2
(45) Date of Patent: Feb. 7, 2006

(54) DEVICE AND METHOD FOR REPAIRING PIPE USING HYDROPHILIC SEALS

(75) Inventors: Larry W. Kiest, Jr., Ottawa, IL (US); Richard A. Fast, LaSalle, IL (US)

(73) Assignee: Blue Sky Forever, Inc., Ottawa, IL (US)

( * ) Notice: Subject to any disclaimer, the term of this patent is extended or adjusted under 35 U.S.C. 154(b) by 221 days.

(21) Appl. No.: 10/727,923

(22) Filed: Dec. 4, 2003

(65) Prior Publication Data

US 2005/0121092 A1    Jun. 9, 2005

(51) Int. Cl.
F16L 55/16    (2006.01)
(52) U.S. Cl. .......................................... 138/98; 138/97
(58) Field of Classification Search .................. 138/97, 138/98
See application file for complete search history.

(56) References Cited

U.S. PATENT DOCUMENTS

| | | | |
|---|---|---|---|
| 3,773,593 A | * | 11/1973 | Casadevall et al. .......... 156/294 |
| 3,894,131 A | * | 7/1975 | Speech ..................... 264/36.11 |
| 5,340,160 A | * | 8/1994 | Meijers et al. ................ 285/15 |
| 5,393,481 A | * | 2/1995 | Wood ......................... 264/516 |
| 5,738,146 A | * | 4/1998 | Abe ............................. 138/97 |
| 5,765,597 A | * | 6/1998 | Kiest et al. .................... 138/98 |
| 5,927,341 A | * | 7/1999 | Taylor .......................... 138/98 |
| 5,950,682 A | | 9/1999 | Kiest, Jr. |
| 6,021,815 A | * | 2/2000 | Kiest et al. .................... 138/98 |
| 6,039,079 A | | 3/2000 | Kiest, Jr. |
| 6,068,725 A | * | 5/2000 | Tweedie et al. ............ 156/287 |
| 6,199,591 B1 | * | 3/2001 | Kiest et al. .................... 138/98 |
| 6,641,687 B2 | * | 11/2003 | Kiest et al. .................... 156/94 |
| 6,688,337 B2 | * | 2/2004 | Ward ............................ 138/98 |

FOREIGN PATENT DOCUMENTS

| | | |
|---|---|---|
| DE | G 93 13 279.0 | 12/1993 |
| EP | 0 564 741 A2 | 10/1993 |

* cited by examiner

*Primary Examiner*—James Hook
(74) *Attorney, Agent, or Firm*—McKee, Voorhees & Sease, P.L.C.

(57) ABSTRACT

A liner tube is provided for repairing either a single pipe line or a main pipe line having a lateral pipe line connected thereto. The liner tube assembly includes a liner tube impregnated with a liquid material capable of curing and hardening. The liner tube includes two hydrophilic sealing members positioned on opposite sides of the damaged portion of the pipe line. The hydrophilic seals, when encountering liquid expand and form a liquid tight seal between the liner tube and the pipe line.

11 Claims, 3 Drawing Sheets

DEVICE AND METHOD FOR REPAIRING PIPE USING HYDROPHILIC SEALS

BACKGROUND OF THE INVENTION

The present invention relates to a device and method for repairing pipe using hydrophilic seals.

Prior methods for repairing damaged pipe lines include moving a liner tube impregnated with a liquid material capable of curing and hardening to the position within the pipe where the damaged portion occurs. The liner tube is urged in an outward radial direction into contact with the pipe line being repaired and the liquid material impregnating the liner tube is permitted to cure and harden. As a result the liner tube forms an interior liner for the pipe being repaired.

On some occasions lateral pipe lines are connected to main pipe lines. Often damage occurs at the junction between the lateral pipe line and the main pipe line. T-shaped or y-shaped liner tubes have been utilized to fit within the junction between the lateral pipe line and the main line. Liner tubes, after hardening form a T-shaped or y-shaped liner to the interior of the junction between the lateral pipe line and the main pipe line.

Ground water outside the lateral pipe line and the main pipe line infiltrates through the damaged portion of the pipe line and between the liner tube and the pipe line to the point where it can enter the pipe line. In order to prevent this infiltration of ground water, attempts have been made to adhere the liner tube to the interior surface of the tube being repaired, whether it is a single straight pipe line or a T-shaped or y-shaped pipe line.

However, considerable difficulty has been encountered in attempting to obtain an adhesive bond between the liner tube and the interior of the pipe being repaired. The interior of the pipe being repaired is often greasy or oily and covered with debris. Attempts have been made to wash the interior of the pipe line with some success, but the washing of the interior of the pipe line is often only partial and is not reliable. Furthermore, in some types of pipes such as polyethylene pipes, an adhesive bond cannot be obtained between the resin impregnated liner tube and the polyethylene pipe.

T-shaped or y-shaped liner tubes hinder this infiltration of ground water, but are also sometimes unreliable. When these T-shaped or y-shaped liner tubes are utilized, there is the possibility of water infiltration between the liner tube and the pipes being repaired.

Therefore, a primary object of the present invention is the provision of an improved device and method for repairing pipe using hydrophilic seals.

A further object of the present invention is the provision of a device and method for repairing pipe wherein the hydrophilic seals provide a water tight seal between the pipe liner and the pipe being repaired.

A further object of the present invention is the provision of a device and method for repairing pipe using hydrophilic bands which surround the liner tube and which are positioned between the liner tube and the pipe being repaired.

A further object of the present invention is the provision of a device and method for repairing pipe using hydrophilic seals between the liner tube and the pipe being repaired, the hydrophilic seals expanding in response to encountering ground water or liquid to provide a water tight seal between the liner tube and the pipe being repaired.

A further object of the present invention is the provision of a device and method for repairing pipe using hydrophilic seals which prevent entry of ground water or other liquid from outside the pipe being repaired to the inside of the pipe being repaired.

A further object of the present invention is the provision of a device and method for repairing pipe which uses hydrophilic seals that expired in the presence of water to provide a seal against entry of ground water for a lateral pipe by itself, a main pipe by itself or a combination of a lateral pipe joined with a main pipe.

A further object of the present invention is the provision of a device and method for repairing pipe which includes circular and stretchable rubber band-like hydrophilic seals that surround the liner and hold the liner around a launcher as the launcher and liner are moved within the pipe line.

A further object of the present invention is the provision of a device and method for repairing pipe which includes stretchable and circular rubber band-like hydrophilic seals that can expand in an outward radial direction in response to outward radial expansion of the liner tube against the pipe being repaired.

A further object of the present invention is the provision of a device and method for repairing pipe which holds the liner tube firmly in place around a launcher or carrier as the unit is robotically positioned within the pipe line.

A further object of the present invention is the provision of a device and method for repairing pipe using hydrophilic seals which is economical to manufacture, durable in use, and reliable in operation.

SUMMARY OF THE INVENTION

The foregoing objects may be achieved by an apparatus for repairing a pipe line having a damaged portion permitting liquid to enter from outside to the interior of the pipe line. The apparatus comprises a liner tube within the pipe line that is impregnated with a liquid material that has cured and hardened. A first hydrophilic band surrounds the main liner tube and is positioned between the main liner tube and the main pipe line on a first side of the damaged portion. A second hydrophilic band surrounds the main liner tube and is positioned between the main liner tube and the pipe line on a second side of the damaged portion opposite from the first side of the damaged portion. The first and second hydrophilic bands are made of a hydrophilic material capable of swelling in both an outward and inward radial direction relative to the pipe line in response to being exposed to the liquid so as to form a seal between the liner tube and the pipe line on opposite sides of the damaged portion of the pipe line.

According to another feature of the present invention, the liner assembly comprises a main liner tube and a lateral liner tube. The main liner tube is within a main pipe line and the lateral liner tube is within a lateral pipe line that is connected to the main line pipe at a pipe joint. The main liner tube and the lateral liner tube are connected to and in communication with one another. The liner assembly is impregnated with a liquid material capable of curing and hardening. A first hydrophilic band surrounds the main liner tube and is positioned between the main liner tube and the main pipe line on a first side of the lateral pipe. A second hydrophilic band surrounds the main liner tube and is positioned between the main liner tube and the main pipe line on a second side of the lateral pipe opposite from the first side of the pipe joint. The first and second hydrophilic bands are made of a hydrophilic material capable of swelling in both an outward and inward radial direction relative to the main pipe line in response to be exposed to liquid so as to form a seal between the main liner tube and the main pipe line on opposite sides of the lateral pipe.

According to another feature of the present invention, a bladder assembly is within the liner assembly and includes a main bladder tube within the main liner tube and a lateral bladder tube within the lateral liner tube. The main bladder tube and the lateral bladder tube are connected to and in communication with one another. A fluid pressure inlet is provided for introducing fluid pressure into the interior of the bladder assembly for urging the main bladder tube and the lateral bladder tube in an outward radial direction to press the main liner tube against the main pipe line and to press the lateral liner tube against the lateral pipe line.

According to another feature of the present invention, a launcher device or carrier is provided within the main liner tube.

According to another feature of the present invention, the first and second hydrophilic bands surround the main liner tube and the launcher device or carrier.

According to another feature of the present invention, the launcher device or carrier comprises an elongated launcher member having a launcher cavity therein, an opening being in the launcher member and being registered with the lateral pipe.

According to another feature of the present invention, the lateral pipe line and the main pipe line are joined in a T-shaped configuration and the liner assembly and bladder assembly are also T-shaped in configuration.

According to another feature of the present invention, the main pipe line and the lateral pipe line are joined together in a y-shaped configuration with the lateral pipe line extending in an oblique direction away from the main pipe line. The liner assembly and the bladder assembly are also y-shaped in configuration and conform generally to the y-shaped configuration of the lateral pipe line and the main pipe line.

According to another feature of the present invention, a third hydrophilic band surrounds the lateral liner tube and is positioned between the lateral liner tube and the lateral pipe line. The third hydrophilic band is made of a hydrophilic material capable of expanding in both an outward and inward radial direction relative to the lateral pipe line in response to being exposed to liquid so as to form a seal between the lateral liner tube and the lateral pipe line.

According to the method of the present invention, the liner tube is surrounded with first and second hydrophilic bands spaced apart axially along the longitudinal axis of the liner tube. The first and second hydrophilic bands are capable of expanding in response to exposure to liquid entering from outside the pipe. The liner tube is impregnated with a liquid material capable of curing and hardening. It is placed within the pipe line in a position wherein the first and second hydrophilic bands are between the liner tube and the pipe line on opposite sides of the damaged portion of the pipe line. The liner tube is then urged in an outward radial direction into contact with the pipe line and with the first and second hydrophilic bands being between the liner tube and the pipe line. The liquid material is permitted to cure and harden. The first and second hydrophilic bands will expand when exposed to liquid entering from outside the pipe and will form first and second seals between the liner tube and the pipe on opposite sides of the damaged portion of the pipe.

DETAILED DESCRIPTION OF THE PREFERRED EMBODIMENT

Figure 1:
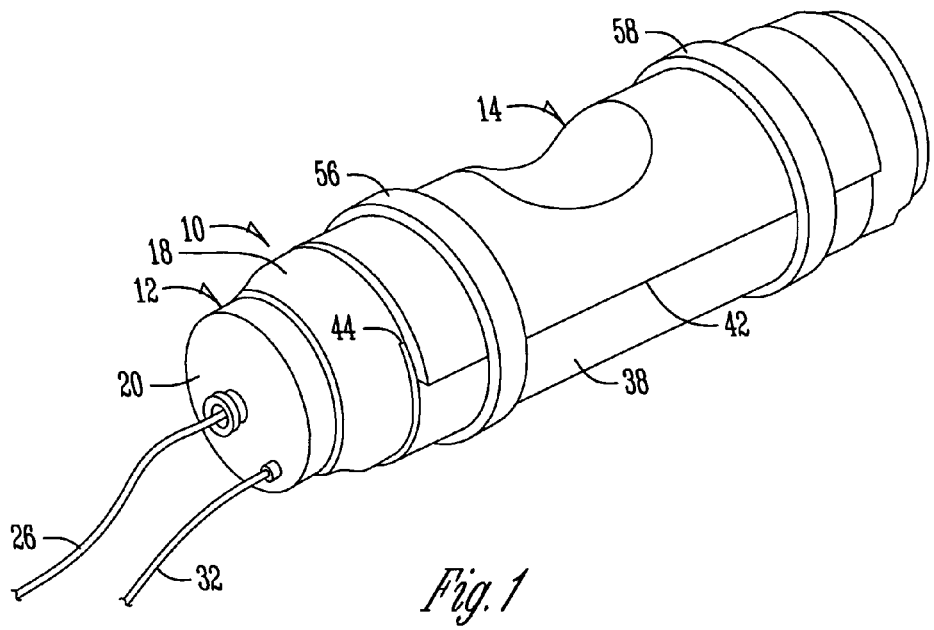
FIG. 1 is a perspective view of a repair assembly for repairing a lateral pipe line and a main pipe line.

Referring to FIGS. 1–4, a repair assembly is generally designated by the numeral 10. Repair assembly 10 includes a carrier or launcher tube 12 having mounted thereto a T-shaped or y-shaped liner assembly 14. Repair assembly 10 also houses a T-shaped or y-shaped bladder assembly 16. In the particular configuration shown in FIGS. 1–4 the liner assembly 14 and bladder assembly 16 are T-shaped, but they can also be y-shaped to accommodate a lateral pipe line that intersects with a main pipe line at an oblique angle.

Carrier tube 12 includes carrier side walls 18, a carrier end cap 20 and a carrier end wall 22, all of which form a carrier tube cavity 48. Carrier end cap 20 includes a line inlet 24 through which a line 26 extends. Line 26 is attached to a closed bladder tube end 28.

Also extending through carrier end cap 20 is an air inlet 30 which is connected to an air hose 32.

T-shaped or y-shaped bladder tube assembly 16 includes a main bladder tube 34 and a lateral bladder tube 36. Similarly, the T-shaped or y-shaped liner assembly 14 includes a main liner tube 38 and a lateral liner tube 40. The bladder assembly 16 is fitted on the interior of the liner assembly 14.

Figure 2:
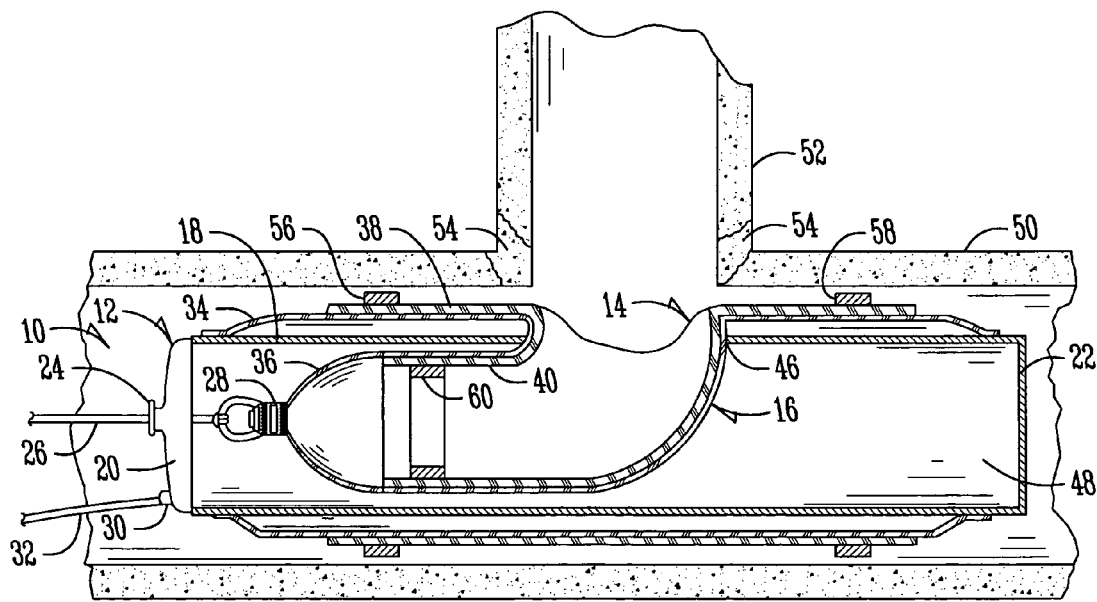
FIG. 2 is a sectional view of a main pipe line and a lateral pipe line showing the device of the present invention.

As can be seen in FIG. 1, the main liner tube 38 is comprised of what is initially a flat material which is wrapped around the outside of carrier tube 12 and which includes overlapping edges 42, 44. The carrier tube 12 includes a carrier tube opening 46 (FIG. 2), and the lateral liner tube 40 is contained within the carrier tube cavity 48 as shown in FIG. 2. Similarly, the lateral bladder tube 36 is contained within the cavity 48 and surrounds the lateral liner tube 40.

Figure 3:
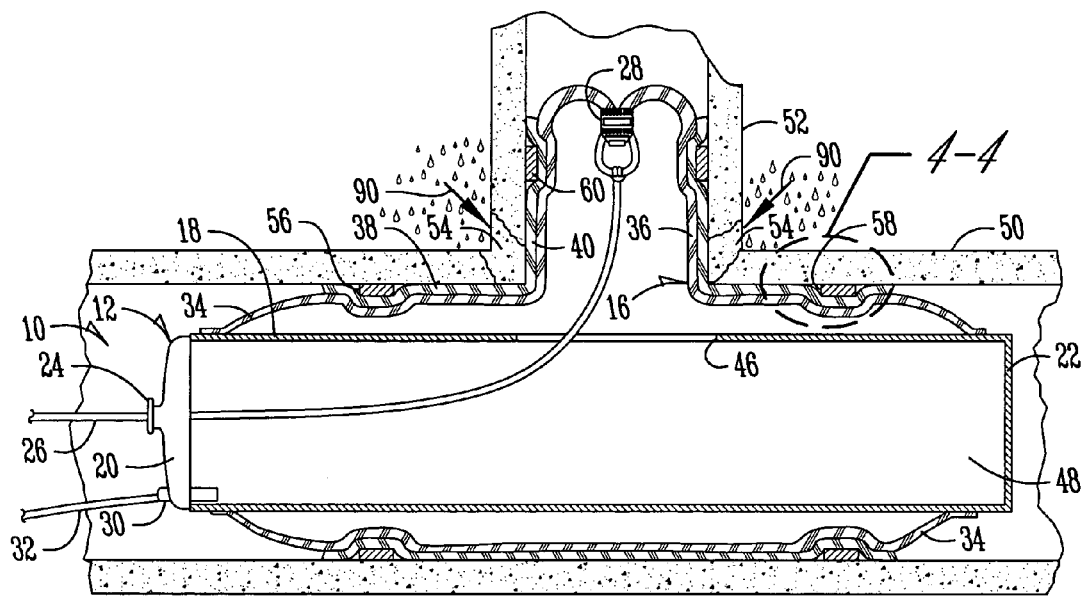
FIG. 3 is a view similar to FIG. 2, but showing the liner tube in its inflated position.
Figure 4:
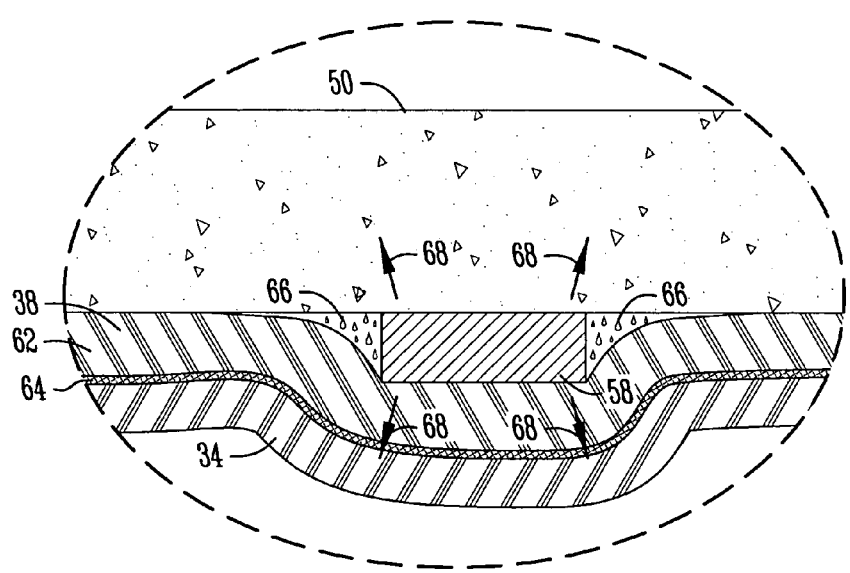
FIG. 4 is a sectional view taken along line 4—4 of FIG. 3.

FIGS. 2–4 show the repair assembly 10 within a main pipe line 50 which is connected to a lateral pipe line 52. The damaged portion 54 is shown needing repair. Ground water from outside the lateral pipe line 52 and the main pipe line 50 will seep through the damaged portion 54 and enter the interior of the main pipe line 50 and lateral pipe line 52.

In order to prevent this seepage of ground water, a first hydrophilic seal 56 and a second hydrophilic seal 58 are wrapped around the main liner tube 38 so as to hold the main liner tube 38 in a tube like configuration around the outside of carrier tube 12.

In addition, a third hydrophilic seal 60 may be optionally placed within the interior of the lateral liner tube 40.

As seen in FIG. 4, both the main liner tube 38 and the lateral liner tube 40 are comprised of a felt layer 62 and a polymer layer 64.

FIG. 2 shows the repair assembly 10 moved within the main pipe line 50 adjacent the lateral pipe line 52. The carrier tube opening 46 is registered with the junction between the lateral pipe line 52 and the main pipe line 50. This alignment is done with a TV camera (not shown). The lateral bladder tube 36 and the lateral liner tube 40 are contained within the cavity 48. It should be noted that the lateral liner tube 40 is inside the lateral bladder tube 56 in FIG. 2 whereas the main liner tube 38 is outside the main bladder tube 34 on the exterior of carrier tube 12.

Air pressure is introduced to cavity 48 through air hose 32, and this increased air pressure causes the lateral bladder tube 36 and the lateral liner tube 40 to invert outwardly through the carrier tube opening into lateral pipe line 52 from the position shown in FIG. 2 to the position shown in FIG. 3. While air is the preferred pressurized material other gases or fluids may be used. It should be noted that this inversion process causes the lateral liner tube 40 to be placed on the outside of the bladder tube 36 once the inversion is complete as shown in FIG. 3.

Continued air pressure introduced into cavity 48 causes the bladder tube assembly 16 to inflate in an outward radial direction and thus it urges the liner tube assembly 14 into contact with the interior walls of the main pipe line 50 and the lateral pipe line 52. In this position, the first, second and third hydrophilic seals 56, 58, 60 are all positioned between the liner tube assembly 14 and the interior walls of main liner tube 50 and lateral liner tube 52. Pressure within cavity 48 is maintained until the liquid hardenable material, preferably a resin activated with a catalyst, cures and hardens. This results in the liner assembly 14 assuming a rigid configuration forming a lining to the lateral pipe line 52 and the main pipe line 50.

The hydrophilic seals or bands 56, 58, 60 are made of a material which is hydrophilic and which is capable of expanding in response to encountering ground water or other liquid. A manufacturer of such hydrophilic material is DeNeef Construction Chemical Company, 18314 Mathis Road, Waller, Tex. 77484 under the trademark SWELLSEAL. The ground water as designated by the arrows 90 in FIG. 3 can seep towards the hydrophilic seals 56, 58, 60. However, upon encountering the hydrophilic seals, the water causes the seals 56, 58, 60 to expand in both a radial inward direction and a radial outward direction. This causes the seals 56, 58, 60 to form water tight seals between the T-shaped or y-shaped liner assembly 14 and the interior walls of the main pipe line 50 and the lateral pipe line 52. It is optional whether the seal 60 is provided, and it can be eliminated without detracting from the invention. The seals 56, 58 are positioned on opposite sides of the damaged portion 54 and also on opposite sides of the junction between the main pipe line 52 and the lateral pipe line 50. The expansion of the seals is illustrated in FIG. 4 wherein the seal 58 is shown to expand in a radial outward direction and in a radial inward direction designated by the arrows 68. The numeral 66 illustrates liquid or ground water that has reached the hydrophilic seal 58.

The seals 56, 58, 60 are not only hydrophilic, but they are also circular and stretchable in the same fashion as rubber bands. When bands 56, 58, surround carrier tube 12 and main liner tube 38, they hold liner tube 38 firmly to the carrier tube or launcher 12 as it is moved along the main pipe line 50. This movement within main pipe line 50 is usually accomplished with robotic equipment (not shown) and the elastic bands 56, 58 are important to hold the main liner tube 38 tightly and firmly to the launcher 12 during this movement. Furthermore, because of their circular shape and elastic stretchable characteristic, bands 56, 58, 60 are capable of expanding in response to expansion of the main liner tube 38 and the lateral liner tube 40 when they are expanded into contact with the main pipe line 50 and the lateral pipe line 52. The seals 56, 58, 60 then swell in the presence of moisture so as to create a positive seal. The liner tubes 38, 40 are circular and the circular bands 56, 58, 60 surround their circumference. When bands 56, 58, 60 swell they provide even compression so that the liner tubes 38, 40 are not pushed away from the pipe being repaired.

Figure 5:
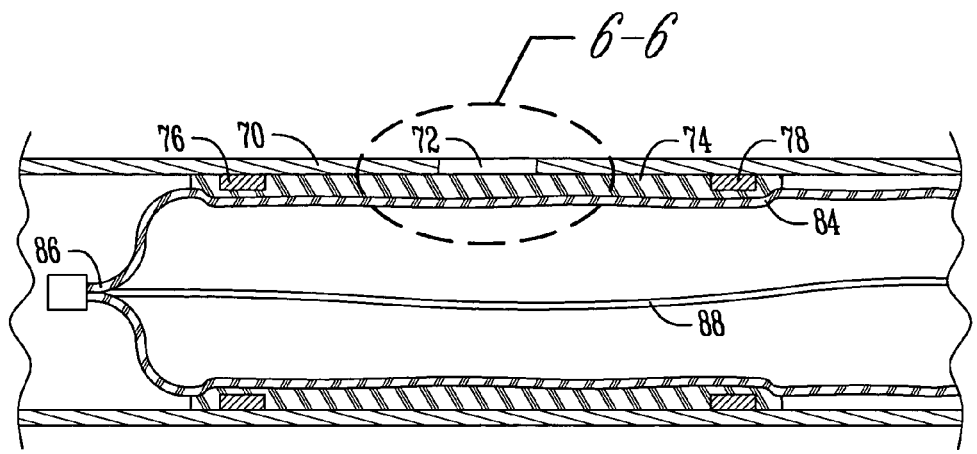
FIG. 5 is a sectional view of a pipe line, showing a simplified modification of the present invention.
Figure 6:
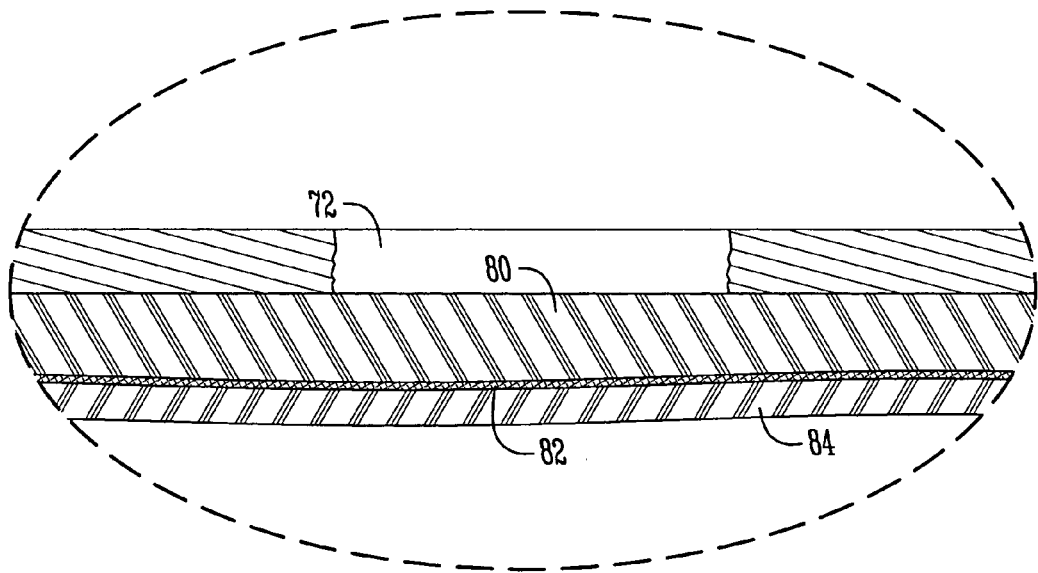
FIG. 6 is a sectional view taken along line 6—6 of FIG. 5.

FIGS. 5 and 6 illustrate a simplified version of the present invention. FIG. 5 illustrates a singular pipe 70 having a damaged portion 72. A liner tube 74 is positioned at the damaged portion 72 and includes a first hydrophilic band or seal 76, and a second hydrophilic band or seal 78 located on opposite sides of the damaged portion 72.

The liner tube 74 comprises a felt player 80 which is impregnated with a liquid material capable of curing and hardening and a polymer layer 82. A bladder tube 84 is inside the liner tube 74 and includes a closed end 86 and a line 88 extending outwardly therefrom. Air or other fluid is introduced into the interior of bladder tube 84 to urge the bladder tube 84 radially outwardly so as to urge the liner tube 74 into contact with the tube 70 being repaired. The first and second hydrophilic seals 76, 78, when encountered by ground water seeping through the damaged portion 72, will expand and form water tight seals on opposite sides of the damaged portion 72. This prevents water from entering the interior of pipe line 70.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. Apparatus for repairing a main pipe line having a lateral pipe line connected thereto and in communication therewith to form a T or a Y pipe joint; the apparatus comprising:

a T or Y shaped bladder assembly comprising a main bladder tube and a lateral bladder tube in communication with one another through a bladder tube juncture;

a T or Y shaped liner assembly comprising a main liner tube and a lateral liner tube in communication with one another through a liner tube juncture;

the lateral bladder tube and the lateral liner tube being within the lateral pipe line, with the lateral bladder tube being inside the lateral liner tube and with the lateral liner tube being between the lateral pipe line and the lateral bladder tube;

the main bladder tube and the main liner tube being within the main pipe line, with the main bladder tube being inside the main liner tube and with the main liner tube being between the main pipe line and the main bladder tube;

the bladder tube juncture and the liner tube juncture being located at the T or Y pipe joint of the main pipe and the lateral pipe;

a first hydrophilic band surrounding the main liner tube and being positioned between the main liner tube and the main pipe line on one side of the T or Y pipe joint of the main pipe line to the lateral pipe line;

a second hydrophilic band surrounding the main liner tube and being positioned between the main liner tube and the main pipe line on the other side of the T or Y pipe joint of the main pipe line to the lateral pipe line;

a liquid material capable of curing and hardening and impregnating the T or Y shaped liner assembly;

the first and second hydrophilic bands being made of a hydrophilic material capable of swelling in both an outward and inward radial direction relative to the main pipe line in response to being exposed to a liquid, thereby forming a seal between the main liner tube and the main pipe line on opposite sides of the pipe joint of the main pipe line to the lateral pipe line.

2. Apparatus according to claim 1 and further comprising a launcher device within the main liner tube.

3. Apparatus according to claim 2 wherein the first and second hydrophilic bands surround the main liner tube and the launcher device.

4. Apparatus according to claim 3 wherein the launcher device comprises an elongated launcher member having a launcher cavity therein, an opening being in the launcher member and being registered with the pipe joint.

5. The apparatus of claim 1 and further comprising a third hydrophilic band surrounding the lateral liner tube and being positioned between the lateral liner tube and the lateral pipe line, the third hydrophilic band being made of a hydrophilic material capable of swelling in both an outward and inward radial direction relative to the lateral pipe line in response to being exposed to the liquid so as to form a seal between the lateral liner tube and the lateral pipe line.

6. Apparatus for repairing a main pipe line having a lateral pipe line connected thereto and in communication therewith to form a T or a Y pipe joint; the apparatus comprising:
    a carrier tube having a cylindrical carrier tube wall within the main pipe line adjacent the T or Y pipe joint, the carrier tube wall having an opening therein;
    a T or Y shaped bladder assembly comprising a main bladder tube on the exterior of the carrier tube wall and a lateral bladder tube inside the carrier tube wall, the T or Y shaped bladder assembly having a bladder tube juncture between the main bladder tube and the lateral bladder tube that extends through the opening in the carrier tube wall;
    a T or Y shaped liner assembly comprising a main liner tube on the exterior of the carrier tube wall and the main bladder tube, and having a lateral liner tube inside the carrier tube wall and the lateral bladder tube, the T or Y shaped liner assembly having a liner tube juncture between the main liner tube and the lateral liner tube that extends through the opening in the carrier tube wall;
    a first hydrophilic band surrounding the main liner tube and being positioned between the main liner tube and the main pipe line on one side of the T or Y pipe joint of the main pipe line to the lateral pipe line;
    a second hydrophilic band surrounding the main liner tube and being positioned between the main liner tube and the main pipe line on the other side of the T or Y pipe joint of the main pipe line to the lateral pipe line;
    a liquid material capable of curing and hardening and impregnating the T or Y shaped liner assembly;
    the lateral bladder tube and the lateral liner tube being capable of inversion outwardly from the interior of the carrier tube wall through the opening in the carrier tube wall and into the lateral pipe line whereby the lateral liner tube is between the lateral bladder tube and the lateral pipe line;
    the first and second hydrophilic bands being made of a hydrophilic material capable of swelling in both an outward and inward radial direction relative to the main pipe line in response to being exposed to a liquid, thereby forming a seal between the main liner tube and the main pipe line on opposite sides of the pipe joint of the main pipe line to the lateral pipe line.

7. Apparatus according to claim 6 and further comprising a third hydrophilic band inside the lateral liner tube that is within the lateral bladder tube and the carrier tube walls, the third hydrophilic band surrounding and being between the lateral liner tube and the lateral pipe line after the inversion of the lateral liner tube into the lateral pipe line, the third hydrophilic band forming a seal between the lateral liner tube and the lateral pipe line in response to exposure to the liquid.

8. A method for repairing a main pipe line having a lateral pipe line connected thereto and in communication therewith to form a T or a Y pipe joint; the method comprising:
    taking a T or Y shaped bladder assembly comprising a main bladder tube and a lateral bladder tube in communication with one another through a bladder tube juncture;
    taking a T or Y shaped liner assembly comprising a main liner tube and a lateral liner tube in communication with one another through a liner tube juncture;
    moving the lateral liner tube and the lateral bladder tube within the lateral pipe line, with the lateral bladder tube being within the lateral liner tube and with the lateral liner tube being between the lateral pipe line and the lateral bladder;
    impregnating the T or Y shaped liner assembly with a liquid material capable of curing and hardening;
    positioning the main liner tube and the main bladder tube within the main pipe line, with the main bladder tube being within the main liner tube and with the main liner tube being between the main pipe line and the main bladder, and with the bladder juncture and the liner juncture being located at the T or Y pipe joint of the main pipe and the lateral pipe;
    surrounding the main liner tube with a first hydrophilic band positioned between the main liner tube and the main pipe line on one side of the T or Y pipe joint of the main pipe line to the lateral pipe line;
    surrounding the main liner tube with a second hydrophilic band positioned between the main liner tube and the main pipe line on the other side of the T or Y pipe joint of the main pipe line to the lateral pipe line;
    exposing the first and second hydrophilic bands to a liquid that causes the first and second hydrophilic bands to swell in both an outward and inward radial direction relative to the main pipe line so as to form a seal between the main liner tube and the main pipe line on opposite sides of the pipe joint of the main pipe line to the lateral pipe line.

9. The method according to claim 8 and further comprising surrounding the lateral liner tube with a third hydrophilic band positioned between the lateral liner tube and the lateral pipe line, and exposing the third hydrophilic band to a liquid that causes the third hydrophilic band to swell in both an outward and an inward radial direction relative to the lateral pipe line so a to form a seal between the lateral liner tube and the lateral pipe line.

10. The method according to claim 8 and further comprising placing the lateral liner tube and the lateral bladder tube into the interior of a launcher tube within the main pipe line, the main liner tube being connected to the lateral liner tube through an opening in the launcher tube, the main bladder tube being connected to the lateral bladder tube through the opening in the launcher tube.

11. The method according to claim 10 and further comprising inverting the lateral bladder tube and the lateral liner tube out of the interior of the launcher tube and into the lateral pipe line through the opening in the launcher tube.

* * * * *